BINARY RELATIVE MAGNITUDE COMPARATOR

Filed April 9, 1954 4 Sheets-Sheet 1

INVENTOR.
GERALD D. SMOLIAR
BY S.C. Yuter
ATTORNEY

BINARY RELATIVE MAGNITUDE COMPARATOR

Filed April 9, 1954 4 Sheets-Sheet 2

INVENTOR
GERALD D. SMOLIAR
BY S.C. Yuter
ATTORNEY

May 5, 1959
G. D. SMOLIAR
2,885,655
BINARY RELATIVE MAGNITUDE COMPARATOR
Filed April 9, 1954
4 Sheets-Sheet 3

INVENTOR.
GERALD D. SMOLIAR
BY S.C. Yuter
ATTORNEY

INVENTOR
GERALD D. SMOLIAR
BY S. K. Yuter
ATTORNEY

United States Patent Office 2,885,655
Patented May 5, 1959

2,885,655

BINARY RELATIVE MAGNITUDE COMPARATOR

Gerald D. Smoliar, Brooklyn, N.Y., assignor to Underwood Corporation, New York, N.Y., a corporation of Delaware Application April 9, 1954, Serial No. 422,140

8 Claims. (Cl. 340—149)

This invention relates to information processors and more particularly to apparatus for determining the relationship between characters or items of information.

The determining of the relationship between characters or items of information is an important function which must often be performed in data processing. For example, it is frequency necessary in data processing to compare numerical digits or numbers to determine whether they are equal or, if not equal, to determine which of the numbers is largest or smallest; further it is often necessary to compare letters or groups of letters to determine their alphabetic order.

A device which performs the functions of determining whether characters or items of information are the same, or of determining their relative order of significance, is commonly known as a comparator.

Comparators compare items of information by examining the "characters" by which the information items are represented. A character can be a numerical digit, a letter of the alphabet, a punctuation mark or any similar symbol.

The characters which represent an item of information are usually accorded degrees of significance by virtue of their relative positions in the group of characters which denote the item. Thus in the number 4395, 5 is the least significant character, 9 is the next least significant character, 3 is the second most significant character and 4 is the most significant character. In the name Jones, S may be designated as the least significant character and J as the most significant character.

Comparators compare information items by examining characters of like significance. Thus, in comparing 4395 to 4876, 5 is compared to 6, 9 to 7, 3 to 8 and 4 to 4. The most significant position in which a difference exists determines the comparative order of significance between the items being compared.

In many data processing applications in which comparators are used, the characters are coded. For example, electronic digital computers of the data processing type normally process information items after the characters have been binarily coded as indicated by Table I (alphabetic characters may be coded in a similar manner):

*Table I*

| Character | Binary code |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

The binary code is not an arbitrarily chosen code but is based upon the binary system which uses the binary digits (or "bits") one and zero.

The binary system is a numerical means of expressing a quantity in terms of coefficients of powers of two. For example, the decimal digit 7 is expressed as 111 in the binary system as shown below:

Decimal:

| | |
|---|---|
| as used | 7 |
| as understood | $7(10)^0$ |
| or | $7\times1=7$ |

Binary:

| | |
|---|---|
| as used | 111 |
| as understood | $1(2)^2+(2)^1+1(2)^0$ |
| or | $4+2+1=7$ |

Since the base of this system is two, each coefficient only needs two distinct values, and zero and one are used for this purpose.

As is common to the better-known decimal system, the bits of a binary number possess different degrees of significance in accordance with their relative position in a number. Thus, in Table I, the bit at the right hand side of each binary number is the least significant bit and the bit at the left hand side of each number is the most significance bit. Multiple-character information items may be expressed with the equivalent groups of bits being substituted for each of the characters.

The binary system has been used in data processors because of the ease with which bits can be expressed in an electrical signal. For example, a zero may be expressed by the absence of a pulse and a one by the presence of a pulse. As a specific example, the character 5 (0101) may be represented electrically as follows: no pulse, pulse, no pulse, pulse (most significant bit first).

In numerous applications, it is preferable to compare characters by simultaneously examining all of the bits which represent the characters to be compared. Furthermore, since modern data processors are capable of supplying characters at relatively high speeds (e.g. one-hundred thousand per second in digital computers and several thousand per second from magnetic tapes), a parallel comparison of characters or information items at high speed is necessitated.

It is accordingly an object of the invention to provide an improved comparator.

Another object of the invention is to provide improved apparatus for simultaneously examining all of the representations of the data being compared.

A further object of the invention is to provide an improved high-speed comparator.

Briefly, a comparator in accordance with the invention comprises apparatus for simultaneously receiving signals which represent groups of information, examiners which simultaneously examine the signals to determine the relationship between the groups of information, and apparatus responsive to the examiners for indicating relationship between the groups.

The invention will be more readily understood from the following description and the accompanying drawings in which.

The comparator described herein as illustrative of the invention is an electronic circuit which functions to receive and compare signals representative of binarily-coded characters. The comparator receives the bits (in signal form) in parallel and indicates which of the characters is the larger by detecting the most significant difference between bits of like significance.

The comparator will be described as operating upon signals received from a high-speed digital data processor in which characters are represented in the binary system by electrical signals. Hereinafter, the expressions "bits" and "signals representing the bits" may be used interchangeably unless otherwise indicated by their usage in the text.

As will be recalled, a zero of the binary system is represented by the absence of a pulse and a one is represented by the presence of a pulse.

These pulses are square-wave pulses having a fifty percent duty cycle. Other duty cycles and pulse shapes can also be used. The complete cycle of a pulse consists of the period of time elapsing between the occurrence of the leading edge of the pulse and the leading edge of the next sequential pulse which would occur in a signal of pulses having a constant repetition rate.

In the system being described, the ones can be represented by positive or negative pulses. Normally, data is binarily coded in terms of positive pulses and the use of negative pulses signifies "inverse" binary coding.

Normal and inverse coding are utilized in the apparatus in a two voltage-level system wherein the absence of a positive pulse in the normal code is represented by the same potential as is the presence of a negative pulse in the inverse code. For example, the voltage used to represent both the absence of a positive pulse in the normal code and the maximum amplitude of a negative pulse in the negative code is minus ten volts. The presence of a positive pulse in the normal code is represented by the same potential as is the absence of a pulse in the negative code. For example, the voltage used to represent both the maximum amplitude of a positive pulse in the normal code and the absence of a negative pulse in the inverse code is plus five volts.

Figure 1:
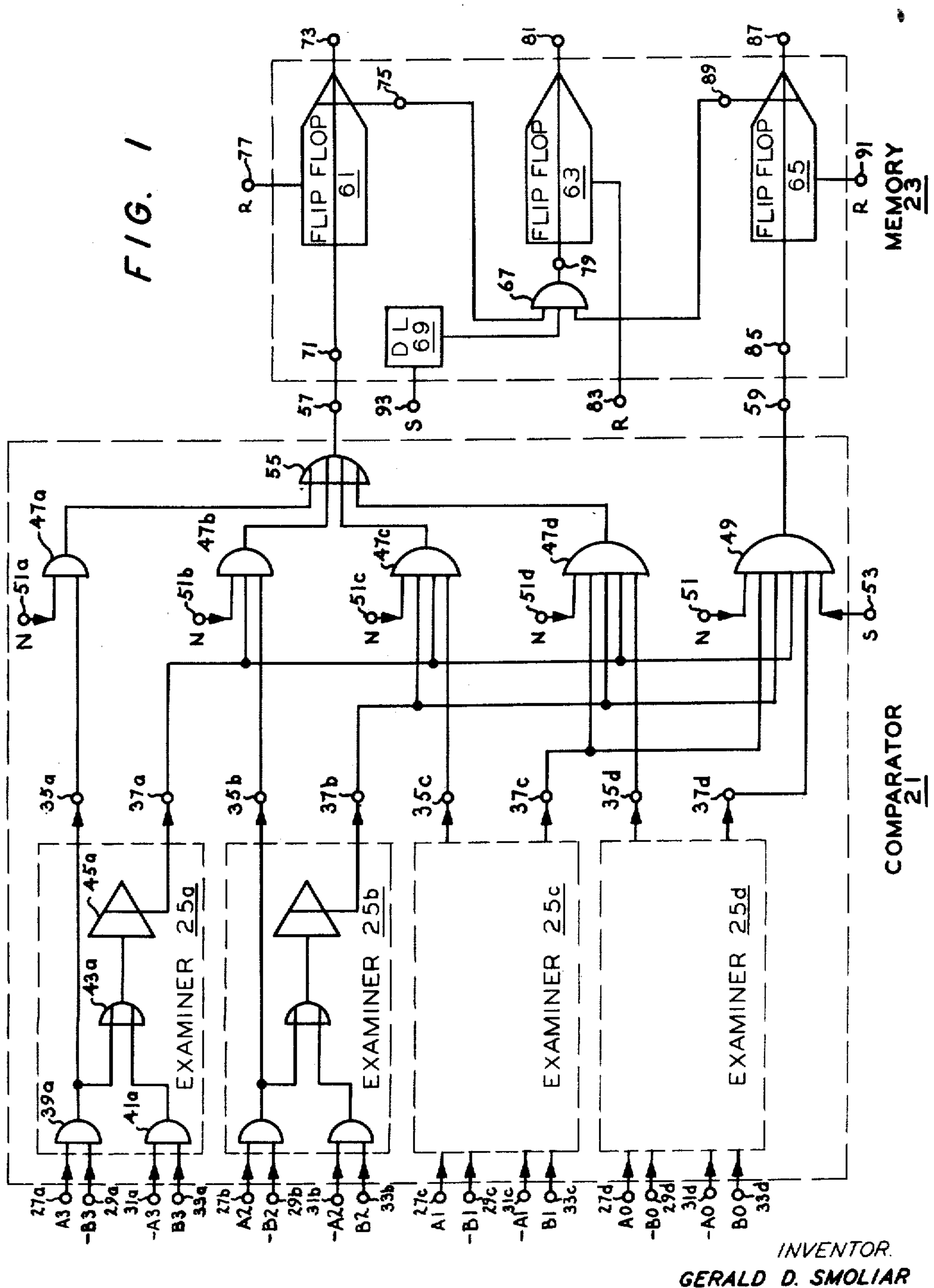
Fig. 1 is a logical diagram of a comparing device in accordance with one embodiment of the invention.

Referring now to the apparatus illustrated in Fig. 1, a comparing means is shown comprising a comparator 21 and a memory 23. The comparator 21 simultaneously receives all of the signals which represent the bits of two characters which are to be compared. The comparator 21 indicates whether these characters are equal, or which is the larger if they are not equal. The function of the memory 23 is to retain the results of the comparison for use in the associated data processing system.

The comparator 21 includes the examiners 25. Although more (or fewer) of the examiners 25 may be included in the comparator 21, four examiners **25*a–d*** are used to provide comparing facilities for characters or information items which can each be represented by four bits.

Each of the examiners 25 receives its signals via the terminals 27, 29, 31 and 33 and includes gates 39 and 41, a buffer 43 and a pulse amplifier 45.

The gates used in this system are coincidence gates (hereinafter described in detail), each comprising a crystal diode network which functions to receive input signals via a plurality of input terminals and to pass the most negative signal. In a two voltage-level system in which the lower voltage level is a negative potential and the upper voltage level is a positive potential, a gate passes a positive signal only when all of the signals received via its input terminals are positive.

The buffers used in the system are "or" gates (hereinafter described in detail), each comprising a crystal diode network which functions to receive input signals via a plurality of input terminals and to pass the most positive signal.

The pulse amplifiers (hereinafter described in detail) each include negative output terminals such as the terminals 37. It is characteristic of each of these pulse amplifiers that the potential present at its negative output terminal is positive unless a positive signal is being received via its associated input terminal. When a positive signal is received by a pulse amplifier, the potential present at its negative output terminal becomes negative for the duration of the positive input signal.

The terminals 27 and 29 are the input terminals of the gates 39. The terminals 31 and 33 are the input terminals of the gates 41. The output terminals of the gates 39 are coupled to the associated terminals 35 of the examiners 25.

The output terminals of the gates 39 are additionally coupled to the input terminals of the buffers 43 as are the output terminals of the gates 41.

Signals fed through the buffers 43 are fed to the pulse amplifiers 45 from which signal indications are transmitted to the terminals 37. The terminals 35 and 37 are the output terminals of the examiners 25.

The comparator 21 also includes the gates 47, the gate 49 and the buffer 55.

One of the input terminals of each of the gates 47 and the gate 49 is coupled to an associated terminal 51 which is supplied by a source of narrow square-wave positive pulses having a twenty-five percent duty cycle. Other duty cycles can be used. The gate 49 furthermore has one of its input terminals connected to the terminal 53 whose function is hereinafter described.

Each of the gates 47 is associated with one of the examiners 25 and one of its input terminals is coupled to the associated terminal 35 of the corresponding examiner 25. More particularly, signals occurring at the terminal **35*a* are transmitted to the gate 47*a*; signals appearing at the terminal 35*b* are transmitted to the gate 47*b*; signals occurring at the terminal 35*c* are transmitted to the gate 47*c*; and signals occurring at the terminals 35*d* are transmitted to the gate 47*d***.

Each of the terminals 37 of the examiners 25 are coupled to certain of the gates 47 (excepting the terminal **37*d*) and to the gate 49. More particularly, the terminal 37*a* is coupled to the input terminals of the gates 47*–bd* and to the gate 49. The terminal 37*b* is coupled to the gates 47*c–d* and to the gate 49. The terminal 37*c* is coupled to the gates 47*d* and 49. The terminal 37*d* is coupled only to the gate 49**.

The output terminals of the gates 47 are coupled via the buffer 55 to the terminal 57 which is one of the output terminals of the comparator 21. The output terminal of the gate 49 is coupled to the terminal 59 which is another output terminal of the comparator 21.

The memory 23 comprises the flip flops 61, 63 and 65, the gate 67 and the delay line 69 and is connected to the terminals 57 and 59.

In addition to receiving signals from the terminals 57 and 59, the memory 23 also receives signals via the terminals 77, 83, 91 and 93. The signal indications of the results of a comparison are transmitted from the memory 23 via the terminals 73, 81 and 87.

The flip flops (hereinafter described in detail) used in the system are bi-stable electronic circuits each of which have a positive and negative output terminal. The negative output terminal of the flip flop 63 is not utilized. In the two voltage-level system previously described, the positive output terminal is maintained at the negative potential level and the negative output terminal is maintained at the positive potential level to denote a "reset" stable-stage.

Each flip flop also includes an input terminal for receiving input signals. Upon the receipt of a positive signal via the input terminal, the potential levels of the output terminals of the flip flop are interchanged to indicate a second or "set" stable state.

Once a flip flop is set, it remains set until a negative signal is received via a "reset" terminal provided for that purpose. The reset terminal is normally maintained at a positive potential.

In the memory 23, the input terminal 71 of the flip flop 61 is connected to the terminal 57. The flip flop 61 includes the positive output terminal 73, the negative output terminals 75 and the reset terminal 77.

The input terminal 85 of the flip flop 65 is connected to the terminal 59. The flip flop 65 includes the positive output terminal 87, the negative output terminal 89 and the reset terminal 91. The negative output terminals 75 and 89 are coupled to the input terminals of the gate 67. Another input terminal of the gate 67 is coupled via the delay line 69 to the terminal 93.

The output terminal of the gate 67 is connected to the input terminal 79 of the flip flop 63 which includes the positive output terminal 81 and the reset terminal 83.

In operation, the comparator 21 functions to receive signals which represent the binary equivalents of two characters hereinafter designated A and B.

If A is greater than B, the comparator 21 transmits a positive signal from the terminal 57. If A equals B, a positive signal is transmitted from the terminal 59. At all other times, negative signals appear at the terminals 57 and 59.

It should be noted that during the receipt of information by the comparator 21, if it is not indicated that A is greater than or equal to B, A must be less than B.

In the description which follows, the four bits which represent A are arbitrarily designated A3, A2, A1 and A0 in decreasing order of significance. The four bits which represent B are arbitrarily designated B3, B2, B1 and B0.

The comparison is performed by comparing bits of like significance from each of the characters. Thus A3 and B3 are compared by the examiner **25*a*; A2 and B2 by the examiner 25*b*; A1 and B1 by the examiner 25*c*; and A0 and B0 (the least significant bits) by the examiner 25*d***. The most significant difference indicates the relative order of the characters being compared.

Each examiner 25 compares by feeding the normally coded bit of A with the inversely coded bit of B to one gate and the inversely coded bit of A with the normally coded bit of B to the other gate. One of the gates 39 or 41 passes a positive signal if there is an inequality because only when there is an inequality will both inputs to a gate be positive. More particularly, the gate 39 which receives the normally coded bit of A passes a positive signal if A is greater than B; the gate 41 which receives the normally coded bit of B passes a positive signal if B is greater than A.

For example in the examiner **25*a*, if both A3 and B3 are ones, the signals representing −A3 and −B3 are negative and prevent a positive signal from passing through the gates 39*a* and 41*a*; if both A3 and B3 are zeros, the signals representing A3 and B3 are negative and prevent the gates 39*a* and 41*a* from passing a positive signal. If, however, A3 is a one and B3 is a zero, the gate 39*a* passes a positive signal since both signals fed to the gate 39*a* are positive. Similarly, if B3 is a one and A3 is a zero, the gate 41*a*** receives two positive signals and passes a positive signal.

In the examiner **25*a*, a positive signal passed by the gate 39*a* is fed to the terminal 35*a*** which thus indicates that A is greater than B.

The gate **39*a* also feeds the positive pulse to the buffer 43*a*. Signals from the gate 41*a* are likewise fed to the buffer 43*a* so that a positive output signal from the buffer 43*a*** indicates that there is an inequality between the bits being compared.

A positive signal from the buffer **43*a* causes a negative signal to appear at the negative output terminal of the pulse amplifier 45*a* and thus at the terminal 37*a***.

The operation of the examiner **25*a* is typical of the operation of the remaining examiners 25*b–d* which transmit a positive signal from the associated terminal 35** when A*n* is greater than B*n* and a negative signal from the associated terminal 37 when there is an inequality between A*n* and B*n*. When A*n* equals B*n*, the signal at the associated terminal 37 remains positive.

The signals from the examiners 25 are transmitted to to the gates 47 and 49 which also receive the narrow positive pulses N via the terminals 51. The pulses N, having a smaller duty cycle than the pulses which may be transmitted from the examiners 25, are in synchronism with these pulses but have a leading edge which trails the leading edge of the examiner 25 pulses by one eighth of a pulse time. Thus the gates 47 and 49 cannot pass positive pulses until the proper conditions have had time to become established at the terminals 35 and 37 of the examiners 25.

Since the most significant inequality between the bits of the characters being examined determines the relative order of the characters, the gate 47 associated with the most significant inequality functions to pass a positive pulse.

More particularly, the gate **47*a* (associated with the examiner 25*a*) can receive an indication that A3 is greater than B3. The gate 47*a*** will, during the presence of a pulse N, pass this information in accordance with the principle that since A3 and B3 are the most significant bits of the characters being examined, no more significant inequality can occur than between A3 and B3.

The gate **47*b* can, however, only pass a positive signal to indicate that A2 is greater than B2 when A3 equals B3. This result is achieved by the connecting of the terminal 37*a* to the gate 47*b* so that at least one negative signal is fed to the gate 47*b*** unless A3 and B3 are equal.

The remaining gates **47*c* and *d* can likewise only pass positive signals when the examiners 25 which examine the more significant bits indicate equality between those bits. Thus the gates 47** collectively function to indicate the most significant inequality.

The signal passed by any of the gates 47 is transmitted via the buffer 55 to the terminal 57. Thus when a positive signal appears at the terminal 57, the character A is greater than the character B.

The function of the gate 49 is to indicate whether the character A equals the character B. To achieve this result, each of the terminals 37 of the examiners 25 is coupled to an associated input terminal of the gate 49. It will be recalled that the terminals 37 are positive when the bits of the characters A and B are equal. The terminals 37 are also positive when there is an absence of information in the comparator 21. To avoid the possibility that the gate 49 will pass a positive signal when there is an absence of information in the comparator 21, an additional gating signal is utilized.

In data processors of the type with which the comparing apparatus of the invention is used, pulse indications are generally provided with the signal representations of data to indicate the presence of information. These pulses (hereinafter designated S pulses) are positive pulses having a fifty percent duty cycle. The S pulses are received in the comparator 21 via the terminal 53.

The S pulses are transmitted to an input terminal of the gate 49 which is otherwise maintained at a negative potential. The gate 49 is thus able to pass a positive signal only when an S pulse is present at the terminal 53. The gate 49 transmits its signal to the terminal 59 so that, when a positive signal is present at the terminal 59, an equality between the characters A and B is indicated.

The function of the memory 23, as previously explained, is to retain the indications of the results of the comparison for further use by associated equipment.

When a positive signal is received in the memory 23 via the terminal 57 it is transmitted to the input terminal 71 of the flip flop 61 which is thereby set so that a positive signal appears at the positive output terminal 73. The positive signal which appears at the positive output terminal 73 indicates that A is greater than B.

When a positive signal is received in the memory 23 from the terminal 59, it is transmitted to the input terminal 85 of the flip flop 65 which is thereby set. A positive signal then appears at the positive output terminal 87 and indicates that A equals B.

It will be noted that negative output terminals 75 and 89 carry negative potentials when their respective flip flops 61 or 65 are set and thus when either of the flip flops 61 or 65 are set, the gate 67 is incapable of passing a positive pulse.

When, however, the flip flops 61 and 65 are reset, as can occur either in the absence of information or when B is greater than A, two of the three input terminals to the gate 67 are positive. To prevent the gate 67 from passing a positive signal in the absence of information in the comparing apparatus, S pulses are again utilized.

The S pulses are received via the terminal 93 and are forwarded via the delay line 69, which provides a one-eighth of a pulse time delay, to the gate 67. The delay line 69 serves to compensate for the slight delays occasioned in the comparator 21 by the use of N pulses. Because of the S pulses, the gate 67 can only pass a positive signal when information is received by the comparing apparatus.

A positive pulse passed by the gate 67 is received by the input terminal 79 of the flip flop 63. When the flip flop 63 is set, a positive signal appears at the positive output terminal 81 and indicates that B is greater than A.

Thus the memory 23 functions to indicate whether (1) A is greater than B.

(2) B is greater than A, or (3) A equals B.

Provision is made for resetting the flip flops 61, 63 and 65, respectively, by means of the terminals 77, 83 and 91 to which R signals are applied. The R signals represent negative signals supplied by the associated data processor at a rate at which comparisons are desired. The R signals reset the flip flops 61, 63 and 65 to clear the memory 23 for the comparison of the next set of characters.

It should be noted that the period of time elapsing between the receipt of the characters and the receipt of the N pulses at the gates 47 and 49 constitutes the only delay in indicating the results of the comparison. Since this delay is one-eighth of a pulse time, in a digital system operating at about a one hundred kilocycle pulse rate, the delay is slightly more than one microsecond. It should be further noted that, if the signals representing the characters are received in perfect synchronism, the N pulses are not required thus making comparison almost instantaneous. The comparator can easily make comparisons at the rate of one hundred thousand per second.

Comparing apparatus has thus been illustrated for comparing two characters each of which is represented by four bits. If information items which include a plurality of characters are to be compared simultaneously, the comparison can be accomplished by simply including more of the examiners 25 with their associated circuitry. A second method for comparing information items having a plurality of characters is next illustrated.

Figure 2:
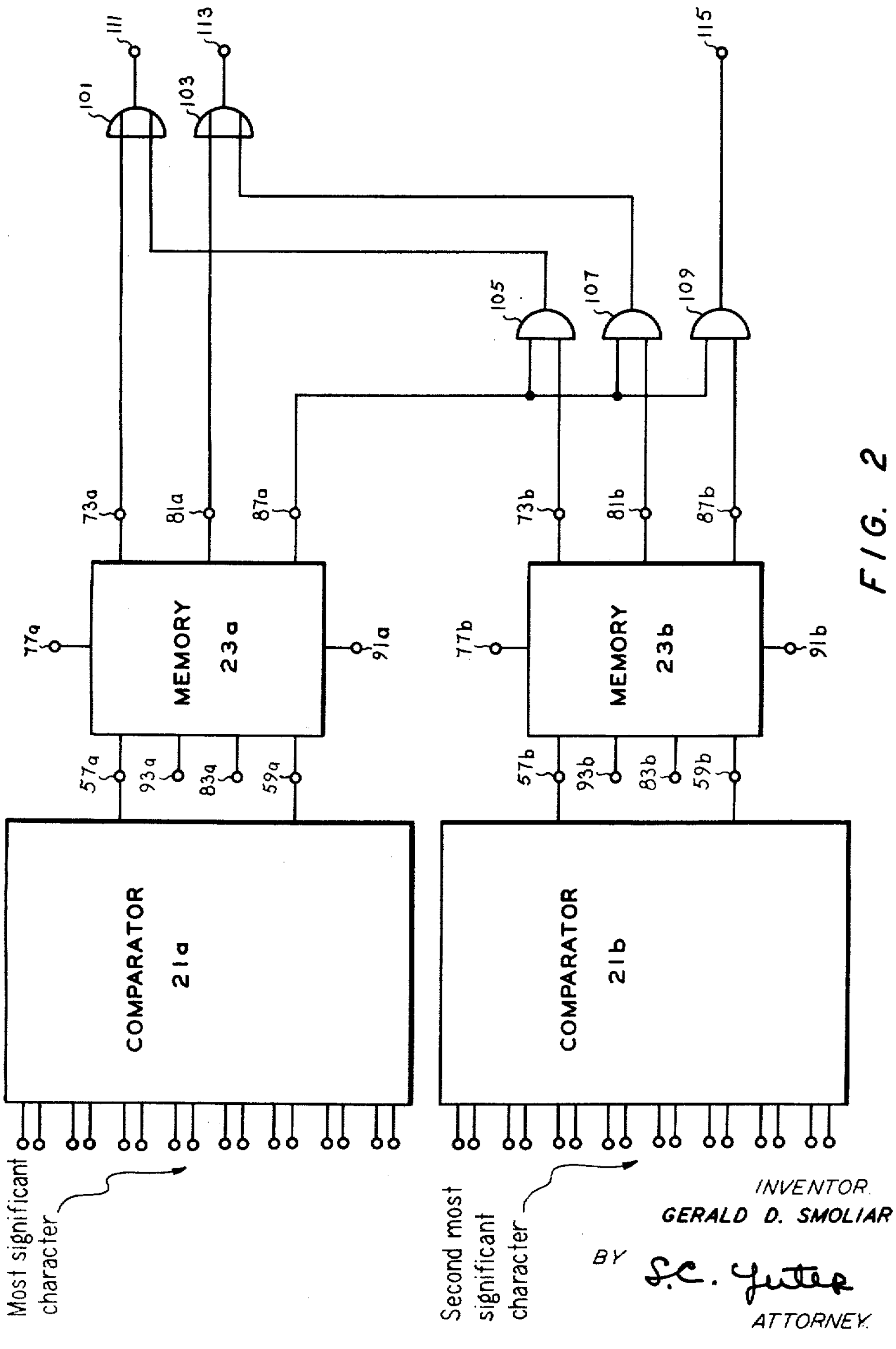
Fig. 2 illustrates the combined use of two comparing devices such as shown in Fig. 1.

The comparing apparatus of Fig. 2 is shown as comprising two of the units shown in Fig. 1. In Fig. 2, the comparator 21a compares the most significant characters and the comparator 21b compares the next most significant characters.

As previously explained in detail, the signals which appear at the terminals 73 indicate whether A is greater than B, the signals appearing at the terminals 81 indicate whether B is greater than A and the signals appearing at the terminals 87 indicate whether A equals B.

In comparing characters, as well as in comparing bits, the most significant inequality is controlling. It is, therefore, necessary that the indications produced by the comparator 21a and the memory 23a take precedence over those of the comparator 21b and the memory 23b. Thus the terminals 73a and 81a are respectively coupled directly via the buffers 101 and 103 to the terminals 111 and 113.

The signal which appears at the terminal 111 indicates if the information item including the characters A is greater than the information item containing the characters B. The signal appearing at the terminal 113 indicates that the information item including the characters B is greater than the information item containing the characters A.

A positive signal appears at the terminal 87a when A equals B in the comparator 21a. Thus unless there is an inequality indicated by the comparator 21a, the gates 105, 107 and 109 receive a positive signal from the terminal 87a.

In this event, the gate 105 can pass a positive signal from the terminal 73b to the buffer 101 to indicate that the information item containing the characters A is greater than the information item containing the characters B. This signal appears at the terminal 111.

Similarly, the gate 107 can pass a positive signal from the terminal 81b to the buffer 103 to indicate that the information item containing the characters B is greater than the information item containing the characters A. This signal appears at the terminal 113.

The gate 109 transmits its signal to the terminal 115. Since the input terminals of the gate 109 are coupled to the terminals 87a and *b*, a positive signal can only appear at the terminal 115 when the two information items being compared are equal.

Thus apparatus has been shown for comparing information items each of which includes two characters. The apparatus of Fig. 2 can be simply modified to include additional units thereby providing apparatus for comparing any number of characters simultaneously.

Comparing devices have thus been illustrated in accordance with the invention which enable the comparison of characters or information items as supplied by high speed data processors. The details of the comparator components will next be shown.

*Gate*

The gates used in the comparator are of the "coincidence" type, each comprising a crystal diode network which functions to receive input signals via a plurality of input terminals and to pass the most negative signal.

Figure 3:
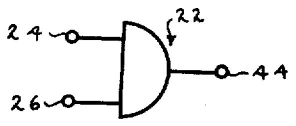
Fig. 3 shows the symbol for a gate.

The symbol for a representative gate 22, having two input terminals 24 and 26, is shown in Fig. 3. Since the signal potential levels in the system are plus five volts (positive signals) and minus ten volts (negative signals), the potentials of the signals which may exist at the input terminals 24 and 26 are thereby limited.

If a potential of minus ten volts is present at one or both of the input terminals 24 and 26, a potential of minus ten volts will exist at the output terminal 44. Therefore, if one of the input signals to the input terminals 24 and 26 is positive and the other signal is negative, the negative signal is passed and the positive signal is "blocked."

When there is a coincidence of positive signals at the two input terminals 24 and 26, a positive signal is transmitted from the output terminal 44. In such case, it may be stated that a positive signal is "passed" by the gate 22.

The schematic details of the gate 22 are shown in

Figure 4:
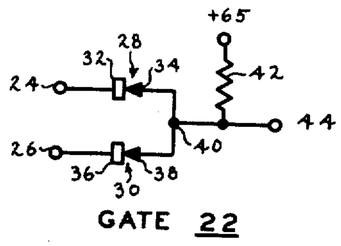
Fig. 4 illustrates the circuit represented by the symbol of Fig. 3.

Fig. 4. Gate 22 includes the crystal diodes 28 and 30. Each of the input terminals 24 and 26 is coupled to one of the crystal diodes 28 and 30. Crystal diode 28 comprises the cathode 32 and the anode 34. Crystal diode 30 comprises the anode 38 and the cathode 36. More particularly, the input terminals 24 and 26 are respectively coupled to the cathode 32 of the crystal diode 28 and the cathode 36 of the crystal diode 30. The anode 34 of the crystal diode 28 and the anode 38 of the crystal diode 30 are interconnected at the junction 40. The anodes 34 and 38 are coupled via the resistor 42 to the positive voltage bus 65.

If negative potentials are simultaneously present at the input terminals 24 and 26, both of the crystal diodes 28 and 30 will conduct, since the positive supply bus 65 tends to make the anodes 34 and 38 more positive. The voltage at the junction 40 will then be minus ten volts since, while conducting, the anodes 34 and 38 of the crystal diodes 28 and 30 assume the potential of the associated cathodes 32 and 36.

When a positive signal is fed only to the input terminal 24, the cathode 32 is raised to a positive five volts potential and is made more positive than the anode 34, so that crystal diode 28 stops conducting. As a result, the potential at the junction 40 remains at the negative ten volts level. In a similar manner, when a positive signal is only present at the input terminal 26, the voltage at the junction 40 will not be changed.

When the signals present at both input terminals 24 and 26 are positive, the anodes 34 and 38 are raised to approximately the same potential as their associated cathodes 32 and 36 and the potential at the junction 40 rises to a positive potential of five volts.

The potential which exists at the junction 40 is transmitted from the gate 22 via the connected output terminal 44.

In the above described manner, the gate 22 is frequently used as a switch to govern the passage of one signal by the presence of one or more signals which control the operation of the gate 22.

It should be understood that the potentials of plus five volts and minus ten volts used for purpose of illustration are approximate, and the exact potentials will be affected in two ways. First, they will be affected by the value of the resistance 42 and its relation to the impedances of the input circuits connected to the input terminals 24 and 26. Second, they will be affected by the fact that a crystal diode has some resistance (i.e., is not a perfect conductor) when its anode is more positive than its cathode, and furthermore will pass some current (i.e., does not have infinite resistance) when its anode is more negative than its cathode. Nevertheless, the assumption that signal potentials are either plus five or minus ten volts is sufficiently accurate to serve as a basis for the description of the operation taking place in the comparator.

*Buffer*

The buffers used in the comparator are also known as "or" gates. Each buffer comprises a crystal diode network which functions to receive input signals via a plurality of input terminals and to pass the most positive signal.

Figure 5:
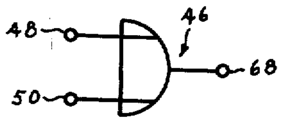
Fig. 5 shows the symbol for a buffer.

The symbol for a representative buffer 46, having two input terminals 48 and 50, is shown in Fig. 5. Since the signal potential levels in the system are minus ten volts and plus five volts, either one of these potentials may exist at the input terminals 48 and 50.

If a positive potential of five volts exists at one or both of the input terminals 48 or 50, a positive potential of five volts will exist at the output terminal 68. If a negative potential of ten volts is present at both of the input terminals 48 and 50, a negative potential of ten volts will be present at the output terminal 68.

Figure 6:
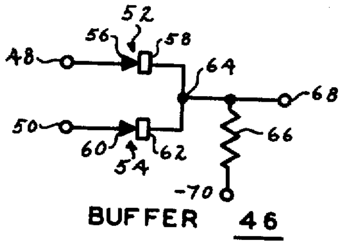
Fig. 6 illustrates the circuit represented by the symbol of Fig. 5.

The schematic details of the buffer 46 are shown in Fig. 6. The buffer 46 includes the two crystal diodes 52 and 54. The crystal diode 52 comprises the anode 56 and the cathode 58. Crystal diode 54 comprises the anode 60 and the cathode 62. The anode 56 of the crystal diode 52 is coupled to the input terminal 48. The anode 60 of the crystal diode 54 is coupled to the input terminal 50. The cathodes 58 and 62 of the crystal diodes 52 and 54, respectively, are joined at the junction 64 which is coupled to the output terminal 68, and via the resistor 66 to the negative supply bus 70. The negative supply bus 70 tends to make the cathodes 58 and 62 more negative than the anodes 56 and 60, respectively, causing both crystal diodes 52 and 54 to conduct.

When negative ten volt signals are simultaneously present at input terminals 48 and 50, the crystal diodes 52 and 54 are conductive, and the potential at the cathodes 58 and 62 approaches the magnitude of the potential at the anodes 56 and 60. As a result, a negative potential of ten volts appears at the output terminal 68.

If the potential at one of the input terminals 48 or 50 increases to plus five volts, the potential at the junction 64 approaches the positive five volts level at this voltage is passed through the conducting crystal diode 52 or 54 to which the voltage is applied. The other crystal diode 52 or 54 stops conducting since its anode 56 or 60 becomes more negative than the junction 64. As a result, a positive potential of five volts appears at the output terminal 68.

If positive five volt signals are fed simultaneously to both input terminals 48 and 50, a positive potential of five volts appears at the output terminal 68, since both crystal diodes 52 and 54 will remain conducting. Thus the buffer 46 functions to pass the most positive signal received via the input terminals 48 and 50.

*Delay line*

Figure 7:
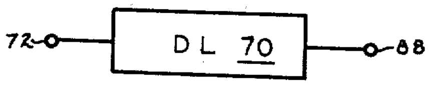
Fig. 7 shows the symbol for a delay line.

The symbol for a representative electrical delay line 70 which is a lumped parameter type delay line, and which functions to delay received pulses for discrete periods of time, is shown in Fig. 7.

The delay line 70 comprises the input terminal 72 and the output terminal 88. Pulses are fed via the input terminal 72 to the delay line 70. When a pulse reaches the output terminal 88, the total delay provided by the delay line 70 has been applied.

Figure 8:
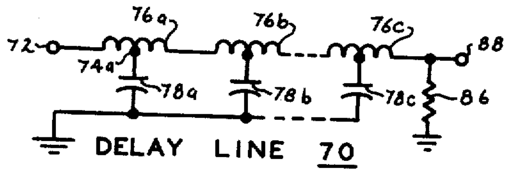
Fig. 8 shows the circuit represented by the symbol of Fig. 7.

The delay line 70 shown in Fig. 8 comprises a plurality of inductors 76 connected in series, with the associated capacitors 78, which couple a point 74 on each inductor 76 to ground. A signal is fed into the delay line 70 at the input terminal 72 and the maximum delay occurs at the output terminal 88. The delay line 70 is terminated by a resistor 86 in order to prevent reflections.

*Pulse amplifier*

Figure 9:
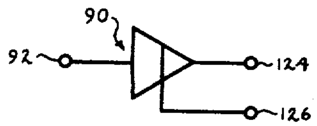
Fig. 9 shows the symbol for a pulse amplifier.

The symbol for a representative pulse amplifier is shown in Fig. 9. When a positive pulse is fed to the pulse amplifier 90 via the input terminal 92, the pulse amplifier 90 functions to transmit a positive pulse which swings from minus ten to plus five volts from its positive output terminal 124, and a negative pulse which swings from plus five to minus ten volts from its negative output terminal 126. At all other times, the pulse amplifier 90 has a negative potential of ten volts at its positive output terminal 124 and a positive potential of five volts at its negative output terminal 126.

Figure 10:
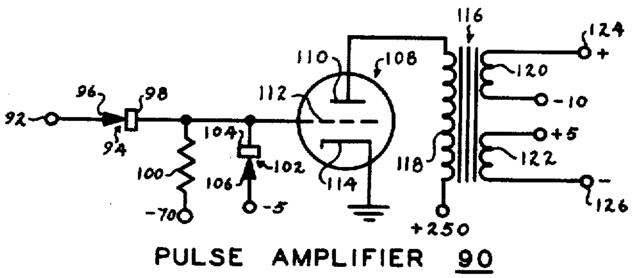
Fig. 10 shows the circuit represented by the symbol of Fig. 9.

The detailed circuitry of the pulse amplifier 90 is shown in Fig. 10. The pulse amplifier 90 includes the vacuum tube 108, the pulse transformer 116 and associated circuitry. The vacuum tube 108 comprises the cathode 114, the grid 112 and the anode 110. The pulse transformer comprises the primary winding 118 and the secondary windings 120 and 122.

The crystal diode 94 couples the grid 112 of the vacuum tube 108 to the input terminal 92, the anode 96 of the crystal diode 94 being coupled to the input terminal 92, and the cathode 98 being coupled to the grid 112. The negative supply bus 70 is coupled to the grid 112 via the resistor 100 and tends to make the crystal diode 94 conductive. The grid 112 and the cathode 98 of the crystal diode 94 are also coupled to the cathode 104 of the crystal diode 102, whose anode 106 is coupled to the negative supply bus 5. The crystal diode 102 clamps the grid 112 at a potential of minus five volts thus preventing the voltage applied to the grid 112 from becoming more negative than minus five volts.

When a voltage moret positive than minus five volts is transmitted to the input terminal 92, the crystal diode 94 conducts and the voltage is applied to the grid 112. Since the crystal diode 102 clamps the grid 112 and the cathode 98 of the crystal diode 94 at mius five volts, any voltage more negative than minus five volts will cause the crystal diode 94 to become nonconductive, and that input voltage will be blocked at the crystal diode 94. Thus, the clamping action of the crystal diode 102 will not affect the circuitry which supplies the input voltage.

The cathode 114 of the vacuum tube 108 is connected to ground potential. The anode 110 of the vacuum tube 108 is coupled by the primary winding 118 of the pulse transformer 116 to the positive supply bus 250. The outer ends of the secondary windings 120 and 122 of the pulse transformer 116 are coupled respectively to the positive output terminal 124 and the negative output terminal 126. The inner ends of the secondary windings 120 and 122 are coupled respectively to the negative supply bus 10 and the positive supply bus 5.

A positive pulse which is fed to the grid 112 of the vacuum tube 108 will be inverted at the primary winding 118 of the pulse transformer 116 which is wound to produce a positive pulse in the secondary winding 120 and a negative pulse in the secondary winding 122. These pulses respectively drive the positive output terminal 124 up to a positive five volts potential and the negative output terminal 126 down to a negative ten volts potential because of the circuit parameters.

When the vacuum tube 108 is nonconducting, the negative ten volts potential is fed through the secondary winding 120 and appears at the positive output terminal 124. At the same time, the positive five volts potential is fed through the secondary winding 122 to the negative output terminal 126. These latter conditions are the normally existing conditions at the output terminals 124 and 126.

*D.-C. amplifier*

Figures 11, 12:
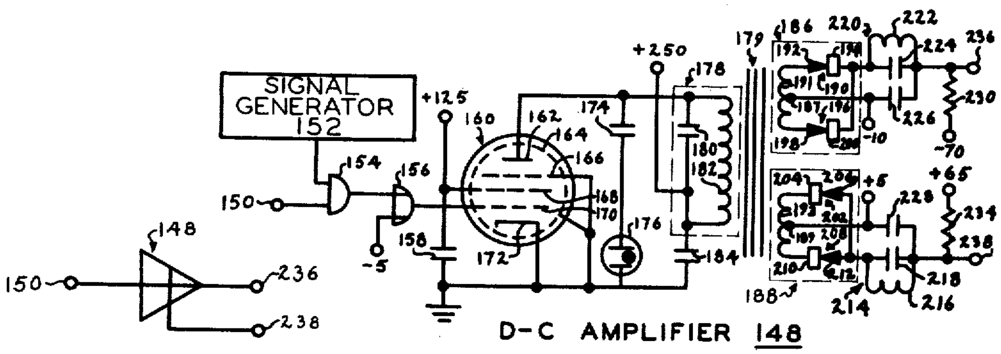
Fig. 11 shows the symbol for a D.-C. amplifier.
Fig. 12 illustrates the circuit represented by the symbol of Fig. 11.

The symbol for a representative D.-C. amplifier 148 is shown in Fig. 11. When a positive signal is present at the input terminal 150, a positive signal of five volts appears at the positive output terminal 236 and a negative signal of ten volts is present at the negative output terminal 238. If a negative potential is present at the input terminal 150, the potentials at the output terminals 236 and 238 are reversed.

As shown in Fig. 12, the D.-C. amplifier 148 includes the gate 154, the buffer 156, the vacuum tube 160, the transformer 179, the full-wave rectifiers 186 and 188, and the filters 220 and 214.

The input terminal 150 is connected to one input terminal of the gate 154. The other input of the gate 154 is fed a one megacycle carrier signal from the signal generator 152 which is a signal generator of known type. The megacycle carrier signal swings from minus ten to plus five volts.

One input of the buffer 156 is connected to the output of the gate 154. The other input of the buffer 156 is connected to the negative supply bus 5. The buffer 156 couples the output of the gate 154 to the control grid 170 of the vacuum tube 160.

The vacuum tube 160 is a five element tube having a grounded cylindrical shield 164, and includes the anode 162 connected via the primary winding 182 of the transformer 179 to a positive supply bus 250. The junction of the positive supply bus 250 and the primary winding 182 is coupled via the capacitor 184 to ground. The vacuum tube 160 also includes the suppressor grid 166 which is connected to ground, the screen grid 168 which is connected to the positive supply bus 125 and via the capacitor 158 to ground, and the cathode 172 which is grounded.

The anode 162 of the vacuum tube 160 is also connected via the coupling capacitor 174 to the neon tube 176 which is grounded. The capacitor 180 is connected in parallel with the primary winding 182 of the transformer 179 to form the parallel tank circuit 178 which is tuned to the frequency of the carrier signal.

The full-wave rectifier 186 is connected to the secondary winding 191 having its center tap 187 connected to the negative supply bus 10. The full-wave rectifier 186 includes the pair of crystal diodes 190 and 196. The anodes 192 and 198 of the crystal diodes 190 and 196 are respectively coupled to opposite ends of the secondary winding 191 of the transformer 179, and the cathodes 194 and 200 of the crystal diodes 190 and 196 are interconnected.

The full-wave rectifier 188 is connected to the secondary winding 193 having its center tap 189 connected to the positive supply bus 5.

The full-wave rectifier 188 includes the pair of crystal diodes 202 and 208. The cathodes 204 and 210 of the crystal diodes 202 and 208 are coupled to opposite ends of the secondary winding 193, and the anodes 206 and 212 of the crystal diodes 202 and 208 are connected together.

The filter 220 which couples the cathodes 194 and 200 of the crystal diodes 190 and 196 to the positive output terminal 236 is a parallel tank circuit which includes the capacitor 224 and the inductor 222. The capacitor 226 connects the positive output terminal 236 to the negative supply bus 10. The positive output terminal 236 is also coupled via the resistor 230 to the negative supply bus 70.

The filter 214, which couples the anodes 206 and 212 of the crystal diodes 202 and 208 to the negative output terminal 238, is a parallel tank circuit which includes the capacitor 218 and the inductor 216. The capacitor 228 connects the negative output terminal 238 to the positive supply bus 5. The negative output terminal 238 is also coupled by the resistor 234 to the positive supply bus 65.

Initially, the crystal diodes 190 and 196 are in a conductive state such that the potential at the positive output terminal 236 is approximately minus ten volts. Similarly, the crystal diodes 202 and 208 are initially in a conductive state such that the potential at the negative output terminal 238 is approximately plus five volts.

When a signal is fed to the input terminal 150 it is combined with the one megacycle carrier and fed to the buffer 156. As previously noted, one input terminal of the buffer 156 is connected to a negative five volts supply bus so that all signals at the output of gate 154 which are equal to or more positive than minus five volts will be passed by the buffer 156. A signal passed by the buffer 156 is applied to the control grid 170 of the vacuum tube 160. The signal is amplified by vacuum tube 160 and appears across the parallel tank circuit 178. The parallel tank circuit 178 is tuned to the frequency of the incoming signal so that the maximum signal will be passed by the parallel tank circuit 178 to the full-wave rectifiers 186 and 188.

The full-wave rectifier 186 delivers a positive signal which is then filtered by the filter 220 to appear as a positive direct-current potential of approximately five volts at the positive output terminal 236. The full-wave rectifier 188 delivers a negative signal which is then filtered by the filter 214 to appear as a negative direct-current potential of approximately ten volts at the negative output terminal 238.

Thus, if a positive signal is present at the input terminal 150, the voltage at the positive output terminal 236 is plus five volts, and the potential at the negative output terminal 238 is minus ten volts. However, if no signal is present at the input terminal 150, the voltage at the positive output terminal 236 will be minus ten volts, and the potential at the negative output terminal 238 will be plus five volts.

Generally, it should be noted that this D.-C. amplifier is a carrier type D.-C. amplifier with positive and negative output signals comprising only one vacuum tube and producing output signals equal in magnitude to the input signals. It should also be noted that the D.-C. amplifier includes a transformer and rectifiers for producing output signals of the desired magnitude from a low impedance source, the D.-C. amplifier thereby being especially adaptable for use in conjunction with networks of crystal diodes.

*Flip flop*

A flip flop of the type used in the comparing apparatus is a bi-stable electronic circuit with two output terminals, one of which is maintained at one potential level and the other of which is maintained at a second potential level to indicate one stable state. Upon receipt of a positive signal by the flip flop 240 the potential levels of the two output terminals are interchanged to indicate a second stable state.

Figure 13:
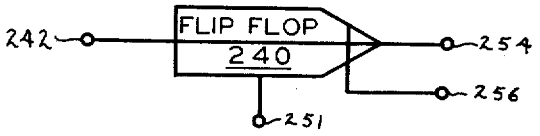
Fig. 13 shows the symbol for a flip flop.

The symbol for a representative flip flop 240 is illustrated in Fig. 13. The flip flop 240 comprises the input terminal 242, a reset terminal 251, positive output terminal 254, and negative output terminal 256.

One stable state of the flip flop 240 is the normal condition which is designated "reset" and exists when a negative potential of ten volts appears at the positive output terminal 254 and a positive potential of five volts appears at the negative output terminal 256. The second stable state is designated "set" and exists when a positive potential of five volts appears at the positive output terminal 254 and a negative potential of ten volts appears at the negative output terminal 256.

The flip flop 240 is set when a positive input signal is received via its input terminal 242. Once set, the flip flop 240 remains set as long as positive signals are received via the reset terminal 251 even though the "setting" pulse or signal has terminated. When the signal received via the reset terminal 251 becomes negative, the flip flop 240 is reset. After being reset, the set dominant flip flop 240 remains reset until the above recited set conditions are fulfilled.

Figure 14:
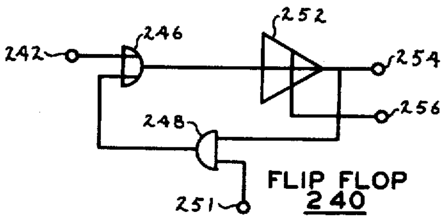
Fig. 14 is a logical diagram of the circuit represented by the symbol of Fig. 13.

The detailed circuitry of the flip flop 240 is illustrated in Fig. 14 employing some of the logical symbols previously described.

The flip flop 240 comprises the buffer 246, the D.-C. amplifier 252 and the gate 248.

The input terminal 242 is the input terminal of the buffer 246. A positive signal which is transmitted to the input terminal 242 is passed through the buffer 246 to the D.-C. amplifier 252, and causes the D.-C. amplifier 252 to generate a positive potential of five volts at its positive output terminal 254 and a negative potential of ten volts at its negative output terminal 256.

The gate 248 couples the positive output terminal 254 of the D.-C. amplifier 252 to the buffer 246. When a positive signal is present at the reset terminals 251, the gate 248 passes the positive signal to the buffer 246. Thus a feedback path is provided which enables the positive potential of five volts to be maintained at the positive output terminal 254 and which is blocked only when a negative signal causes the gate 248 to be blocked.

There will now be obvious to those skilled in the art many modifications and variations utilizing the principles set forth and realizing many or all of the objects and advantages of the circuits described but which do not depart essentially from the spirit of the invention.

What is claimed is:

1. Apparatus for performing a comparison of two characters of information represented by electrical signals, each character being comprised of a plurality of bits of information of different orders of significance, said apparatus comprising receiving means for receiving all said electrical signals as pairs of signals of equal significance, electronic gating means simultaneously responsive to said receiving means for examining said pairs of signals for inequality, indicating means responsive to said gating means to indicate equality or the relative order of said characters, and control means set by the one of said gating means which detects an inequality and is of the highest order of significance to disable control of said indicating means by each gating means of a lower order of significance.

2. A comparator for simultaneously examining the signals representing all of the binary digits forming a pair of characters, said comparator comprising a plurality of examining units, one for each of the binary digits forming a character, means for applying to each examining unit the signals representing the binary digits of the same order of significance of each of said characters, each examining unit having a first gate responsive to said signals to pass a signal when the binary digit of a first character is larger than the binary digit of the second character and a second gate responsive to said signals to pass a signal when the binary digit of the second character is larger than the binary digit of the first character, a cyclically controlled sampling gate connected to the output of said first gate, an amplifier having an output signal, and a buffer coupling said first and said second gates to said amplifier, said amplifier responding to the signals passed by said first and second gates by terminating said output signal, means to apply the output signal of each amplifier to the sampling gate of each examining unit of a lower order of significance to enable said gates, an output buffer connected to the outputs of all of said sampling gates to pass a signal to indicate that said first character is larger than said second character, an output gate to receive the output signals of all of said amplifiers for indicating when said characters are equal, a first bi-stable device responsive to said output buffer signal to retain an indication that said first character is the larger of said characters, a second bi-stable device responsive to said output gate to retain an indication that said characters are equal, and a sampling circuit to indicate that said second character is the larger of said characters, said sampling circuit being disabled by said first and said second bi-stable devices when either of said bi-stable devices is set to retain an indication.

3. Apparatus for determining the relative order of two characters of information, each character being represented by a plurality of signals having differing orders of significance, said apparatus comprising a plurality of signal examining devices, each of which compares the two signals of corresponding order of significance and provides a first output if the signal of the first of said characters is the more significant and a second output if said signals are equivalent, a first bi-stable device settable by any of said first outputs, a second bi-stable device settable only by a second output from all of said examining devices, and a plurality of gates connected between said examining devices and said first bi-stable device, each gate passing a first output signal of an associated examining device when a second output signal is received from each examining device for signals of a higher order of significance.

4. Apparatus for comparing characters of information, each character being represented by a plurality of signals having different orders of significance, said apparatus comprising a plurality of signal examiners, each signal examiner comparing the two signals, one from each character, which are of the same order of significance and supplying a first output signal if the signal for the first of said characters is solely present, and a second output signal if similar signals are present for both characters, a plurality of sampling gates, each gate connected to receive the first output signal from an associated signal examiner and the second output signal from each signal examiner for signals of a higher order of significance, an equality gate receiving said second output signals from all said signal examiners, a buffer combining the outputs from all said sampling gates, a first indicating device set by said buffer when any signal is received by said indicating device, a second indicating device settable by said equality gate when all said signal examiners are supplying a second output signal, and a third indicating device settable only if said first and second indicating devices are not set.

5. A character comparing apparatus for determining the relative order of two characters, each character being represented by a plurality of electrical signals of differing orders of significance, said apparatus comprising an examining device for each order of significance, connecting means to apply the pair of signals having the same order of significance from said two characters to an examining device, each examining device having a first gate passing a first output signal if one character has a signal of that order of significance and the other character does not and a second gate, a buffer and a signal inverter to generate a second output signal if the said two characters each have the same signal for that order of significance, a cyclically sampled gate connected to the inverter of each of said examining devices to pass an equality signal only if all of said examining devices generate said second output signal, an output gate for each examining device, each output gate connected to its associated examining device to receive said first output signal and connected to each examining device for a more significant signal to receive said second output signals, and an output buffer connected to all said output gates to pass a signal indicating that said first character is of a higher order than said second character.

6. The invention as set out in claim 5 including a memory device to retain an indication of the relative order of said characters, comprising a first bi-stable indicator settable by a pulse passed by said output buffer to indicate that said first character is the more significant, a second bi-stable device settable by an equality pulse from said sampled gate and a third bi-stable device settable to indicate that said second character is the more significant, said third bi-stable device including a cyclically pulsed input gate which is disabled by said first and second bi-stable devices when set.

7. A device to detect the relative order of two characters, each represented by a plurality of electrical signals of differing orders of significance, said device comprising an examiner for each signal of said plurality of signals, each examiner comparing pairs of signals of like order of significance, a signal generator in each examiner to generate an equality signal when the pair of signals applied to said examiner are identical, an inequality gate for each examiner to pass an inequality signal when a signal is present in a first of said characters but not in the second of said characters, connections between each inequality gate and the signal generators of each examiner of a more significant order to enable said inequality gate only when all examiners for higher orders have detected equality between their applied signals, and an equality gate connected to all said signal generators and rendered effective to pass a character equality signal when all said examiners detect an equality between the pair of signals applied thereto.

8. A detecting device as set out in claim 7 including a first indicator settable by a signal from any inequality gate to indicate that the first character is more significant than said second character, a second indicator settable by a signal from said equality gate to indicate that said characters are of equal significance, a third indicator settable to indicate that said second character is more significant than said first, and a setting gate for said third indicator, said setting gate receiving a pulse when said character signals are received by said examiners and receiving enabling signals from said first and second indicators as long as said first and second indicators remain unset.

References Cited in the file of this patent

UNITED STATES PATENTS

| | | |
|---|---|---|
| 2,074,392 | Herbst | Mar. 23, 1937 |
| 2,501,821 | Kouzmine | Mar. 28, 1950 |
| 2,604,262 | Phelps | July 22, 1952 |
| 2,615,127 | Edwards | Oct. 21, 1952 |
| 2,623,171 | Woods-Hill | Dec. 23, 1952 |
| 2,641,696 | Woolard | June 9, 1953 |
| 2,749,440 | Cartwright | June 5, 1956 |

FOREIGN PATENTS

| | | |
|---|---|---|
| 1,005,754 | France | Apr. 15, 1952 |
| 1,040,913 | France | May 27, 1953 |
| 688,049 | Great Britain | Feb. 25, 1953 |

OTHER REFERENCES

Electronic Engineers, October 1953, "Serial Digital Adders for Variable Radix of Notation," by Townsend, fig. 6, pages 410 to 416.

Proc. of the IRE "Electronic Circuits of the NAREC," October 1953 by Sherertz, fig. 12, pages 1313–1320.

Electronic Engineers, December 1950, "The Physical Realization of an Electronic Digital Computor," by A. D. Booth, fig. 3, pages 492–498.